Jan. 24, 1967
B. F. BACHUS
3,300,554
METHOD OF MAKING CELLULAR ARTICLES
Filed Sept. 27, 1963
4 Sheets-Sheet 1
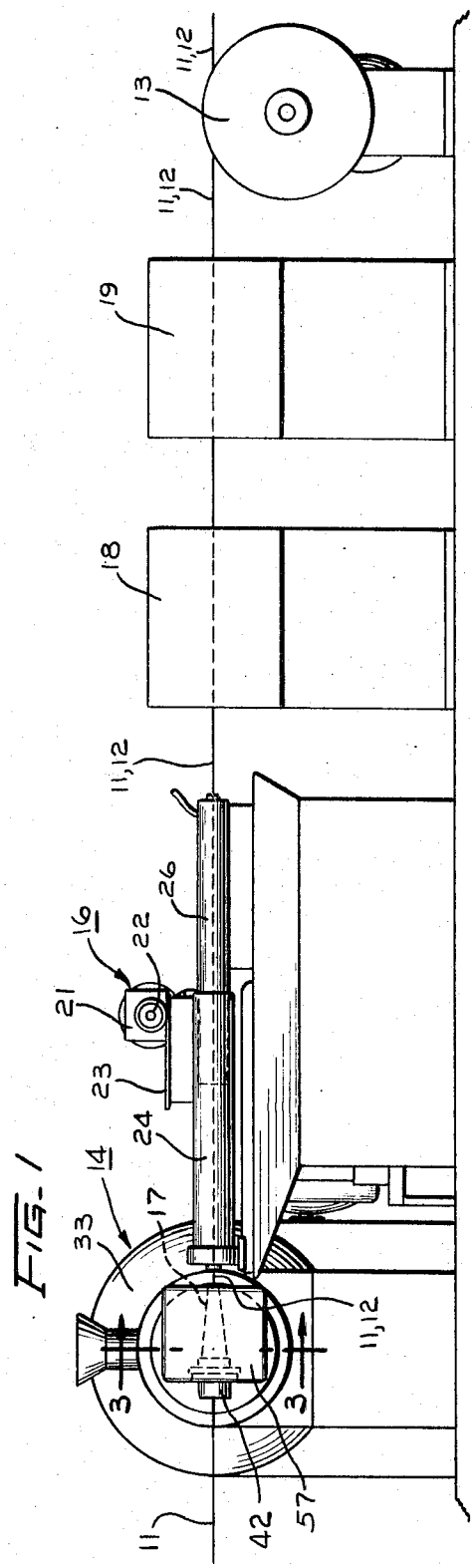
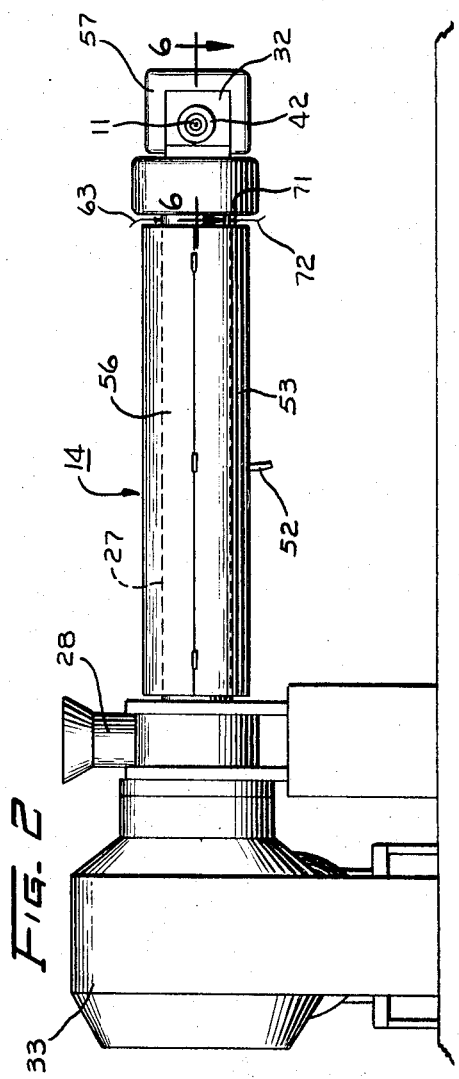
INVENTOR
B.F. BACHUS
BY
ATTORNEY

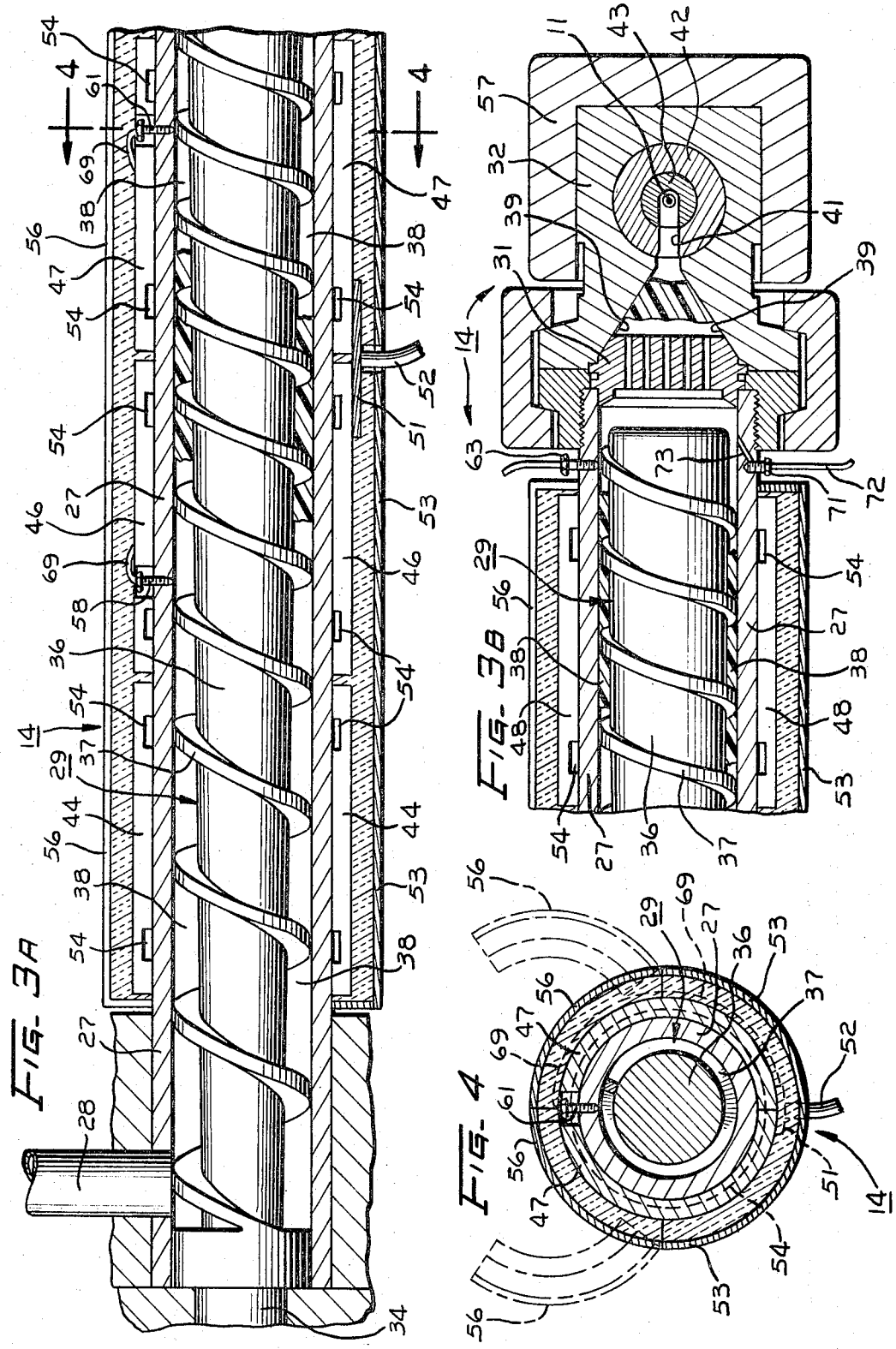

Jan. 24, 1967     B. F. BACHUS     3,300,554
METHOD OF MAKING CELLULAR ARTICLES
Filed Sept. 27, 1963     4 Sheets-Sheet 3
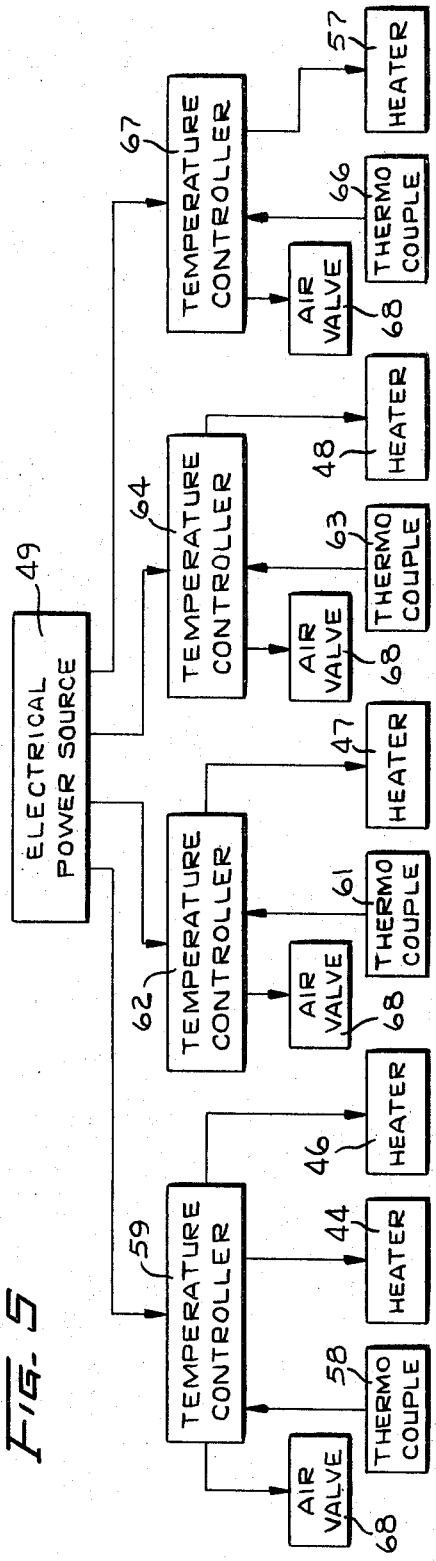
Fig. 5
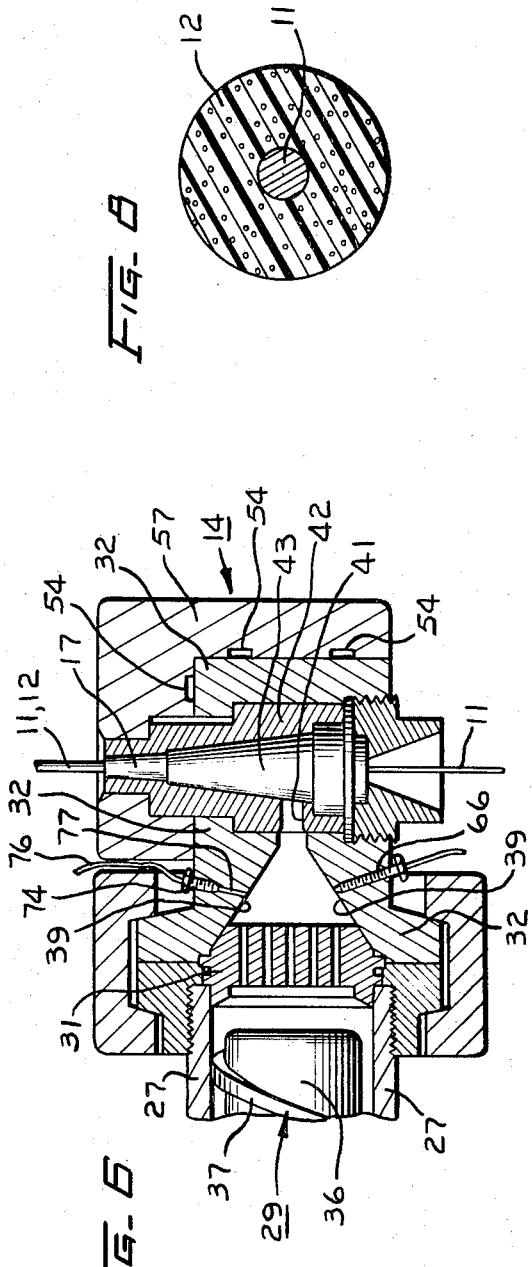
Fig. 8
Fig. 6

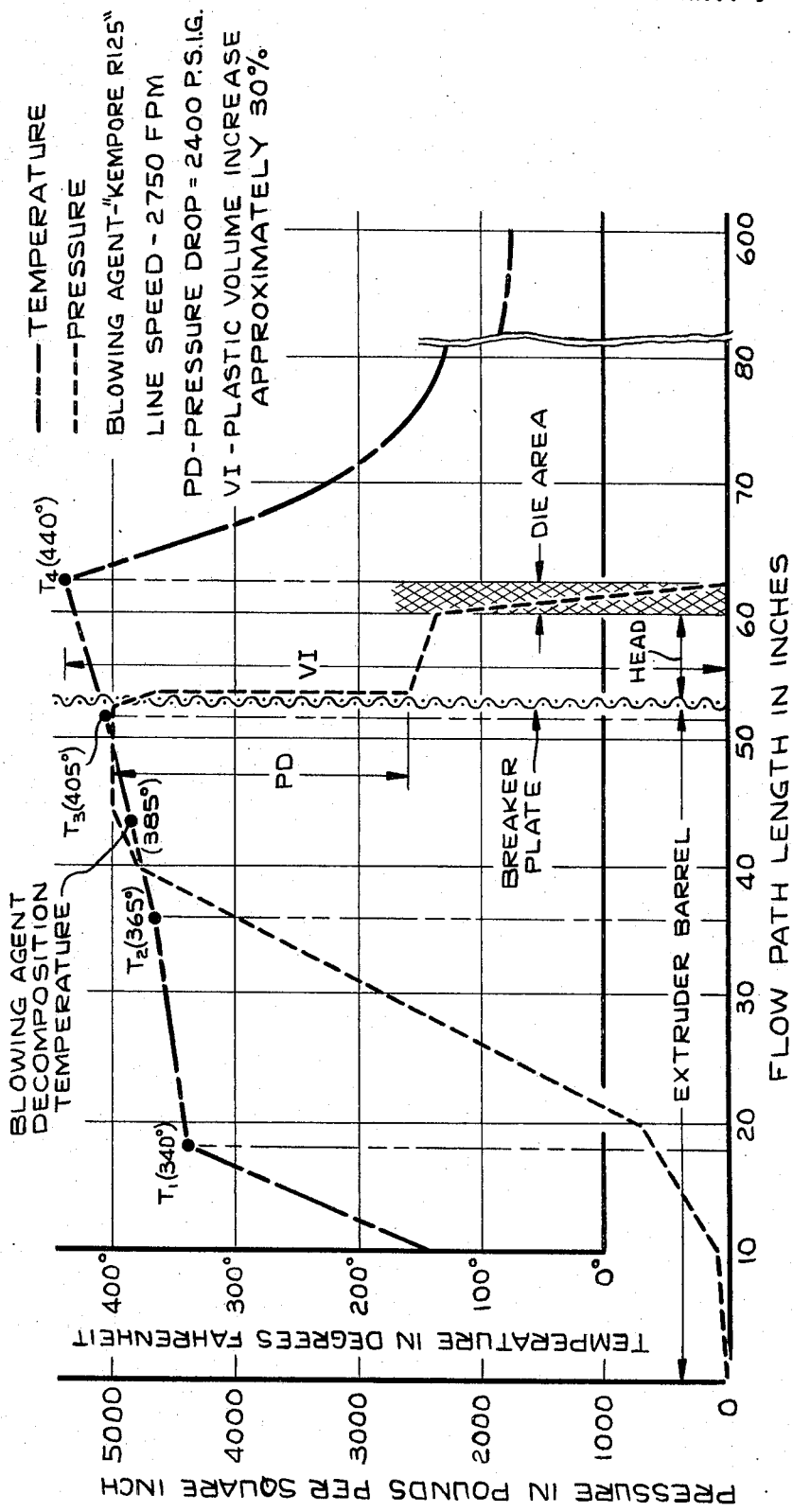

United States Patent Office 3,300,554
Patented Jan. 24, 1967

3,300,554
METHOD OF MAKING CELLULAR ARTICLES
Benson F. Bachus, Omaha, Nebr., assignor to Western Electric Company, Incorporated, New York, N.Y., a corporation of New York
Filed Sept. 27, 1963, Ser. No. 312,098
7 Claims. (Cl. 264—47)

This invention relates to a method of making cellular articles, and more particularly to a method of making an article having at least a portion thereof of cellular construction, in which material and a heat decomposable blowing agent are worked under heat and pressure to liquefy the material and to decompose the blowing agent as the material is being advanced to an extrusion die, and in which the blowing agent causes the material to expand to produce the cellular portion of the article. It is an object of this invention to provide a new and improved method of this character.

In the manufacture of electrical conductors having expanded plastic insulation, plastic and a heat decomposable blowing agent are worked under heat and pressure in an extrusion chamber to liquefy the plastic and to decompose the blowing agent. The material then is extruded onto an electrical conductor wire as the wire travels longitudinally through an extrusion die, and the wire with the plastic extruded thereon passes from the extrusion die through the atmosphere to a water cooling trough. During the travel of the wire through the atmosphere the blowing agent causes the plastic on the wire to expand to form a multitude of small discrete cells or air voids within the plastic. Then, as the wire enters the cooling trough the temperature of the plastic is substantially reduced and its expansion is substantially arrested, with the resultant insulation on the electrical conductor wire being of a cellular construction.

The cellular construction of the insulation makes electrical conductor wires insulated in this manner extremely useful for communication purposes, particularly as components of communciation cable, providing the insulation possesses certain desirable characteristics, as for example, such that the capacitance of the insulated wire is substantially uniform along its length. In this regard, the cellular construction of the insulation must be uniform in nature, that is, the number and size of the air voids in the insulation must be uniform along the length of the wire, the insulation must have a uniform outside diameter, and the insulation must be concentric with respect to the longitudinal axis of the wire, that is, of uniform radial thickness.

Heretofore, in attempts to obtain an insulated electrical conductor wire having uniform capacitance along its length, one or more mechanisms have been provided for monitoring the capacitance of the wire after the insulation has been cooled in the water trough, and certain phases of the insulating process which affect the capacitance of the wire have been controlled in response to respective ones of these monitors. For example, the insulating line speed of the wire, which affects wire capacitance for various reasons, has been controlled in response to such a monitor. Similarly, the position of the entrance end of the water cooling trough with respect to the exit end of the extruder die also has been varied in response to a capacitance monitor, to vary the time of expansion of the extruded insulation between the exit end of the extrusion die and the entrance to the cooling trough, thereby providing a control over the capacitance of the insulated wire.

However, while an arrangement of this type produces insulated wire of more uniform capacitance than an arrangement in which no control for variations in the capacitance of the wire is provided, it is not entirely satisfactory because of a lack of control over the expansion of the plastic as it passes into the atmosphere from the extrusion apparatus, in which it is maintained under high pressure so as to permit no expansion thereof, and as it travels with the wire through the atmosphere to the water cooling trough, which must be located a considerable distance (approximately 18 inches) from the exit end of the extrusion die so as to permit the desired amount of expansion of the plastic to take place before its expansion is arrested by the cooling water. Further, as the wire passes from the extrusion die to the water trough, the plastic, which is in a fluid state, may tend to flow by gravity to the underside of the wire, thus producing an insulating cover which is eccentric with respect to the longitudinal axis of the wire, rather than concentric with respect thereto, as desired.

Accordingly, another object of this invention is to provide a new and improved method of extruding expanded plastic insulation onto a longitudinally moving electrical conductor wire.

A further object of this invention is to provide a new and improved extrusion method of producing an elongated electrical conductor encircled by cellular insulation in which the construction of the cells or air voids in the insulation is substantially uniform.

A still further object of this invention is to provide a new and improved extrusion method of producing an electrical conductor encircled by cellular insulation in which the insulation is more nearly concentric with respect to the conductor than insulation produced by prior known methods.

Another object of this invention is to provide a new and improved extrusion method of producing an elongated electrical conductor encircled by cellular insulation in which the insulation is of more uniform diameter along the length of the conductor than insulation produced by prior known methods.

A further object of this invention is to provide a new and improved method of extruding material of the type which expands to produce a cellular construction in an article in which better control over the expansion of the material is provided than in prior known methods.

Another object of this invention is to provide a new and improved extrusion method of producing an article having at least a portion thereof of cellular construction.

A further object of this invention is to provide a new and improved extrusion method of producing an elongated article having at least a portion of its entire length of cellular construction, in which the construction of the cells or air voids within the cellular portion is substantially uniform.

A further object of this invention is to provide a new and improved extrusion method of producing an elongated circular article having at least a portion of its entire length of cellular construction, in which the article is of more uniform diameter along its length than articles produced by prior known methods.

In accordance with the invention, in a process for producing an article having at least a portion thereof of cellular construction, material and a heat decomposable blowing agent for expanding the material to produce the cellular portion of the article are worked under heat and pressure to liquefy the material and to decompose the blowing agent while the material is being advanced to an extrusion die. During the process, the major portion of the total expansion of the material which takes place is caused to occur within the extrusion apparatus before the material enters the die, by controlling the working of the material and the expanding action of the blowing agent.

In a preferred embodiment of the invention for producing insulated electrical conductor wire, a plastic compound, such as polypropylene, and a heat decomposable blowing agent, such as hydrocarbonamide, for expanding the plastic to produce a cellular construction within the insulation on the wire, are worked by an extruder screw in an extruder barrel under heat and pressure to liquefy the plastic and to decompose the blowing agent while the plastic is being advanced by the screw through the barrel into an extrusion head and to an extrusion die. In accordance with the invention, over 90% of the total expansion of the plastic which takes place is caused to occur in the extrusion head before the plastic enters the die. This is accomplished by maintaining the temperature of the plastic in the barrel and at the entrance to the die, the pressure in the barrel, and the pressure drop between the discharge end of the barrel and the entrance to the die, at constant values such that the desired expansion of the plastic occurs in the head before the plastic enters the die. Subsequently, the wire with the plastic extruded thereon passes from the die through the atmosphere for a relatively short distance, during which time a slight additional expansion of the plastic occurs, and then the plastic is cooled quickly in a water bath to arrest its expansion before maximum possible expansion thereof has occurred.

This invention, together with further objects and advantages thereof, will best be understood by reference to the following detailed description taken in connection with the accompanying drawings in which:

FIG. 1 is a side elevational view of a portion of a wire insulating line, illustrating apparatus which may be used for practicing the invention;

FIG. 2 is a side elevational view of an extrusion apparatus forming a part of the apparatus shown in FIG. 1;

FIGS. 3A and 3B combined constitute an enlarged, partial, side elevational view in cross-section of the extrusion apparatus shown in FIG. 2, taken substantially along its center line;

FIG. 4 is an enlarged cross-sectional view taken substantially along the line 4—4 of FIG. 3A;

FIG. 5 is a schematic diagram illustrating the interrelation of certain parts of the extrusion apparatus shown in FIGS. 2, 3A, 3B and 4.

FIG. 6 is an enlarged, cross-sectional view of a portion of the extrusion apparatus shown in FIG. 2, taken substantially along the line 6—6;

FIG. 7 is a chart illustrating temperature and pressure conditions in the extrusion apparatus shown in FIGS. 2 through 6, during a typical extrusion process; and FIG. 8 is a cross-sectional view of an electrical conductor wire having cellular plastic insulation.

Referring to FIG. 8 of the drawings, it is seen that the illustrated embodiment of the invention relates to the manufacture of electrical conductor wire 11 of the type having a plastic insulating cover 12 of a cellular construction, that is, having a plurality of small discrete cells or air voids therein. In the illustrated embodiment of the invention, the wire 11 is advanced by a capstan 13 longitudinally to the right, as viewed in FIG. 1, from a source of supply (not shown) through an extrusion apparatus 14 and through a water cooling trough 16. Prior to entering the extrusion apparatus 14 the wire is preheated to the extrusion temperature of the plastic by a preheater of a suitable type, not shown.

As is best shown in FIG. 6, as the wire 11 travels through the extrusion apparatus 14, it passes through an extruding die 17 in which plastic material, which is expanding in a manner to be described, is extruded about the wire. The wire 11 then passes through the atmosphere a short distance, during which time the plastic which has been extruded thereon continues to expand, and into the water cooling trough 16 (FIG. 1) in which the extruded plastic is cooled quickly by being quenched in a water bath to harden it about the wire and to arrest its expansion.

Referring again to FIG. 1, it is seen that the now insulated wire 11 is advanced from the water trough 16 by the capstan 13 through a pair of conventional capacitance monitors 18 and 19, which are designed to monitor and record the capacitance of the wire, and to control respective phases of the insulating process which affect the capacitance of the wire, as for example, the speed of the wire along the insulating line, and the position of the entrance end of the water trough with respect to the exit end of the extruding die 17. The insulated wire 11 subsequently is checked for eccentricity and proper diameter in a suitable sensing device, not shown, and finally is wound on reels by a conventional take-up mechanism, also not shown.

The speed of the wire 11 along the insulating line, which affects the capacitance of the completed insulated wire for various reasons, is varied in response to an associated one of the capacitance monitors 18 and 19 by varying the wire advancing speeds of the capstan 13 and the above-mentioned take-up mechanism in a well-known manner, by mechanism and circuitry, not shown. Similarly, the positon of the entrance end of the cooling trough 16 with respect to the exit end of the extruding die 17, which affects the capacitance of the wire 11 in that it determines the degree to which the plastic can expand before its expansion is arrested by the water in the trough, can be controlled by the other capacitance monitor through similar mechanism and circuitry, and including a reversing type motor 21 (FIG. 1) having a toothed gear 22 mounted on a drive shaft thereof. The gear 22 is engaged with a toothed rack 23 secured to a longitudinally movable water trough entrance section 24, which is telescopingly arranged with respect to a fixed water trough section 26, for driving the entrance section toward and away from the extruding die 17 in response to capacitance error signals from the monitor.

As is best shown in FIGS. 2 and 3A, the plastic, which may be polypropylene or another suitable plastic compound, is premixed with a heat decomposable blowing agent such as hydrocarbonamide, which is manufactured by National Polychemical, Incorporated of Wilmington, Massachusetts, under the trade name "Kempore R125," and then is introduced into the interior of a heated extruder barrel 27 forming a part of the extrusion apparatus 14, through a feed pipe 28 opening through the top of the barrel. The premixing of the plastic and the blowing agent may be accomplished in any suitable manner so as to mix the blowing agent uniformly throughout the plastic. For example, particles of the plastic in the form of granules or pellets may be coated with mineral oil and the blowing agent then dusted onto the particles in powder form by blowing the plastic particles and the powder about in a storage silo (not shown), after which the dusted particles can be fed to the feed pipe 28 and into the extruder barrel 27 in a suitable manner.

As the dusted plastic particles are introduced into the extruder barrel 27, they are engaged by a rotating stock screw 29 and are advanced by the screw to the right, as viewed in FIGS. 3A and 3B, toward an apertured breaker plate 31 (FIG. 3B) positioned across a discharge end of the barrel 27 adjacent the discharge end of the screw for limiting the flow of plastic from the barrel into an extrusion head 32, and thus creating high back pressure within the barrel. The stock screw 29 is rotatably driven by a conventional extruder drive mechanism 33 (FIGS. 1 and 2) drivingly connected to a shaft extension 34 integral with the screw at its left-hand end, as viewed in FIG. 3A. The stock screw 29 includes a root 36 about which a single helical flight 37 is formed, and the helical flight has a constant external diameter along the entire length of the screw, which diameter is substantially equal to the internal diameter of the barrel 27. The helical flight 37 is generally rectangular in cross section and in effect forms two sides of a helical channel 38 bounded on its inner side by the root 36 and on its outer side by the interior wall of the barrel 27.

As viewed in FIGS. 3A and 3B, the depth of the feed channel 38, as a result of a progressive increase in the diameter of the stock screw root 36, decreases progressively from the left-hand or entrance end of the extruder barrel 27 to a point approximately one foot from the right-hand or discharge end of the barrel, at which point the clearance between the root of the screw and the internal wall of the barrel is very small. Thus, as the screw 29 advances the plastic through the heated barrel 27 toward and against the apertured breaker plate 31, the plastic particles are worked intensely with a shearing action and consolidated to form a compact plastic mass, and there is a constant build-up of pressure and temperature within the plastic mass. Approximately the last foot of the root 36 of the screw 29 is uniform in diameter so that substantially no additional working of the plastic takes place in this area, but rather, this section of the screw merely acts to meter the plastic to the breaker plate 31.

The extruder head 32 is detachably secured to the discharge end of the extruder barrel 27 and the plastic flows from the barrel through the apertured breaker plate 31 into a tapered conical passage 39 (FIGS. 3B and 6) formed in the head. The conical passage 39 communicates with an opening 41 in a cylindrical holder 42 for a core tube 43, and the opening 41 connects with an extrusion passage in the core tube and in communication with the extruding die 17. The core tube 43 guides the conductor wire 11 through the axial center of the extruding die 17 during an insulating operation in a well known manner.

As is best shown in FIGS. 3A, 3B and 4, the heating of the extruder barrel 27 is accomplished by four electrical heating devices 44, 46, 47 and 48 arranged about the barrel in axially spaced relationship with respect to one another, and which may be of any suitable type. For example, in the illustrated embodiment of the invention each of the heating devices 44, 46, 47 and 48 is in the form of a pair of semi-circular aluminum plates suitably clamped about the barrel 27 in opposed relationship, with each plate having electrically conducting elements (not shown) embedded therein and connected to a power source 49 (FIG. 5) by suitable leads connected to terminals on a terminal strip 51 (FIG. 3A) suitably mounted adjacent the bottom side of the extruder 14, the terminals being connected to the power source by suitable leads in a conduit 52 passing through an opening in an extruder cover assembly 53. The plates of each of the heating devices 44, 46, 47 and 48 also are provided with air passages 54 therein so that air may be introduced into the extrusion apparatus 14 through suitable lines (not shown) to reduce the temperature of the extruder barrel 27 in the event of overheating. The cover assembly 53, which is lined with a suitable heat insulating material, such as spun glass, surrounds the heating devices 44, 46, 47 and 48 and includes hinged top members 56 (FIG. 4) detachably connectable to one another to retain the cover assembly around the heating devices, and which permit it to be removed from about the heating devices for maintenance and repair purposes.

Referring to FIGS. 2, 3B and 6, it is seen that the extruder head 32 also is provided with a heater 57 of a suitable heat conducting material, such as aluminum, having electrically conducting elements (not shown) embedded therein and connected to the power source 49 by suitable leads. In the illustrated embodiment of the invention, the heater 57 is box-shaped and substantially encloses the extruder head 32 except for the wire entrance side thereof and the side thereof connected to the extruder barrel 27. As is shown in FIG. 6, the side of the heater 57 adjacent the wire exit side of the head 32 is suitably apertured to receive a projecting portion of the core tube holder 42. As in the case of the barrel heaters 44, 46, 47 and 48, the head heater 57 includes passages 54 for air cooling in the event of overheating.

The heating devices 44, 46, 47, 48 and 57 are used to maintain the plastic mass at a progressively increasing temperature as it is advanced through the extruder barrel 27 and the extruder head 32, to prevent the blowing agent from decomposing too rapidly and producing an uncontrollable "runaway" condition in the extrusion apparatus 14. Thus, as is illustrated by the extrusion process chart shown in FIG. 7, the temperature of the plastic as it proceeds through the extruder barrel 27 and the extruder head 32 increases progressively from a value considerably below the decomposition temperature of the blowing agent adjacent the entrance end of the extruder barrel 27 adjacent the feed pipe 28, to an extrusion temperature $T_4$ considerably above the decomposition temperature of the blowing agent at the extruding die 17.

Referring to FIGS. 3A and 5, it is seen that the temperature of the plastic mass at a point located approximately one-third of the length of the extruder barrel 27 from its entrance end is maintained at a constant value by a mechanism including the heaters 44 and 46, a thermocouple 58 screw threaded into the barrel at the one-third point, and a temperature controller 59 (FIG. 5) to which the thermocouple is connected in a manner to be described. Similarly, the temperature of the plastic mass at a point located approximately two-thirds of the length of the extruder barrel 27 from its entrance end is maintained at a constant temperature by the heater 47, a thermocouple 61 screw threaded into the barrel at that point, and a temperature controller 62 (FIG. 5). Further, as is best shown in FIGS. 3B and 5, the temperature of the plastic mass at the discharge end of the barrel 27 is maintained at a constant temperature by the heater 48, a thermocouple 63 and a temperature controller 64 (FIG. 5).

The temperature of the plastic mass in the extruder head 32 is maintained at a constant temperature by the head heater 57, a thermocouple 66 (FIGS. 5 and 6) and a temperature controller 67 (FIG. 5). The temperature controllers 59, 62, 64 and 67 may be of any suitable type, as for example the JSB-3 controller manufactured by the West Instrument Corporation of Chicago, Illinois, such that, as illustrated in FIG. 5, they are responsive to their associated thermocouples 58, 61, 63 and 66 to turn the heaters 44, 46, 47, 48 and 57 on and off as required, and to control associated air valves 68 for introducing air into the passages 54 in the heaters in the event of overheating, as noted hereinabove.

The thermocouples 58, 61, 63 and 66 preferably are of a type having a probe designed to engage the plastic mass of melt directly, as indicated in FIGS. 3A, 3B and 6. As is shown in FIGS. 3A and 4, the barrel thermocouples 58 and 61 are disposed in recesses formed by opposed semicircular cutout portions of the heaters 44 and 46, respectively, and are connected to their associated temperature controllers 59 and 62 by having leads 69 thereof extending downward around the extruder barrel 27 and connected to terminals on the terminal strip 51, the terminals being connected to the temperature controllers by suitable leads in the conduit 52. The barrel discharge end thermocouple 63 and the head thermocouple 66 have leads thereof connected directly to their associated temperature controllers 64 and 67 in any suitable manner.

Since certain portions of the plastic may expand to a greater degree than other portions if the plastic is permitted to expand completely, thus producing an insulating cover 12 having an uneven cell structure and a non-uniform diameter along the length of the conductor wire 11, it is necessary to control the expansion of the plastic and to arrest its expansion before it has attained its maximum possible expansion, in a manner next to be described. In this regard of course, in any one instance the amount of expansion of the plastic which can be permitted to occur, relative to the maximum possible expansion which it can attain, and still achieve an insulating cover 12 of uniform cell structure and diameter, will vary depending on the plastic and the blowing agent involved.

Preferably, the magnitude of the pressure in the extruder barrel 27 is such that substantially no expansion of the plastic by the blowing agent takes place when the plastic is in the barrel. In contrast, the pressure in the conical passage 39 in the extruder head 32 is maintained at a considerably lower value than the pressure in the barrel 27, such that the major portion of the total expansion of the plastic which it to take place occurs in the head. By causing the plastic to expand in the head 32, its expansion can be more readily controlled than if all of the expansion took place in the atmosphere after the plastic had been extruded onto the wire 11, as in prior methods. Preferably, the amount of expansion of the plastic which takes place in the head 32 is over 90% of the total expansion which is to take place.

The desired difference in pressure between the discharge end of the barrel 27, that is, on the left-hand side of the breaker plate 31 as viewed in FIG. 3B, and the pressure in the head 32, which is representative of the pressure at the entrance to the extruding die 17, so as to give the desired expansion of the plastic in the head, can be obtained in various manners. For example, for a given number and size of openings in the apertured breaker plate 31, the speed of the stock screw 29 can be varied to provide the desired pressure differential, with the pressure differential between the two points increasing as the speed of the screw is increased. In the alternative, the speed of the screw 29 can be maintained constant and the breaker plate 31 shown in the drawings can be replaced with a breaker plate in which the effective size of the openings therethrough can be varied.

Referring to FIG. 3B, it is seen that during the operation of the extrusion apparatus 14 the pressure in the barrel 27 adjacent its discharge end is determined by a mechanism including a tubular fitting 71 which is screw threaded into the bottom of the barrel. The fitting 71 is secured to one end of a grease filled tube 72 forming a part of a conventional pressure gage, not shown. The interior of the fitting 71 communicates with the interior of the barrel 27 through a passage 73 extending upward to the right, as viewed in FIG. 3B, to a position closely adjacent the breaker plate 31. The passage 73 is of a relatively small diameter as compared to the internal diameter of the fitting 71, so that plastic forced out of the barrel 27 by the pressure therein into the fitting and the grease filled tube 72 will be in the form of a thin stream which readily intermingles with the grease without completely blocking the fitting and the tube, and which thus, upon hardening, will not interfere with the accuracy of the pressure measurement.

Similarly, referring to FIG. 6, the pressure in the conical passage 39 in the extruder head 32 during an extruding operation is determined by a tubular fitting 74 screw threaded into the head and secured to one end of a grease filled tube 76 forming a part of a second conventional pressure gage, not shown. As in the case of the fitting 71, the interior of the fitting 74 communicates with the conical passage 39 through a passage 77 in the head 32 of relatively small diameter as compared to the internal diameter of the fitting.

The above-mentioned pressure gages are used in setting the speed of the stock screw 29, or in setting the above-mentioned adjustable breaker plate (not shown) if one is employed, to provide the desired pressure drop between the discharge end of the extruder barrel 27 and the head 32, so that the desired expansion of the plastic occurs in the head. This may be accomplished either manually or by suitable automatic apparatus, which is not shown. Further, if desired the barrel and head pressures during the extrusion process can be recorded in a suitable manner so that if an extreme variation in the capacitance of the insulated wire 11 is detected and recorded by the capacitance monitors 18 and 19, it readily can be determined if the discrepancy is due to an improper pressure drop between the barrel 27 and the head 32.

The magnitude of the pressure in the extruded head 32 should be such that the plastic readily is forced out of the extruding die 17 around the conductor wire 11 as the wire passes through the die. The magnitude of the pressure in the extruder barrel 27 at its discharge end should be such that the necessary pressure drop between the discharge end of the barrel and the head 32 or the entrance to the die 17 can take place, so as to provide the desired degree of expansion of the plastic in the head, and such that the plastic readily is forced through the apertured breaker plate 31 into the head. For example, in the extrusion process illustrated in FIG. 7, the pressure in the head 32 varies from 2600 p.s.i.g. at the breaker plate 31 to 2400 p.s.i.g. at the entrance to the die 17, and the pressure in the barrel 27 at its discharge end is on the order of 5000 p.s.i.g., with the pressure drop (PD) between the barrel and the head through the breaker plate being 2400 p.s.i.g.

As noted hereinabove and as shown in FIG. 1, after leaving the extruding die 17 the conductor wire 11 with the extruded plastic thereon passes through the atmosphere to the cooling trough 16, during which time the blowing agent continues to expand the plastic on the wire until it enters the water in the cooling trough, whereupon the temperature of the plastic is substantially reduced and its expansion is substantially arrested. In this regard, the entrance end of the movable section 24 of the cooling trough 16 is located as close as practical to the exit end of the extruding die 17 without interfering with the normal operation of the extrusion apparatus 14, preferably within about two inches, so that the distance which the wire 11 must travel through the atmosphere, in which there is no control over the expansion of the plastic, is as short as possible. By arranging the cooling trough 16 in this manner the external diameter of the insulating cover 12 can be controlled so that it is only slightly greater than the internal extrusion diameter of the die 17, to provide an insulating cover of a preselected diameter. Further, any tendency for certain portions of the plastic to expand faster than other portions as the wire 11 passes through the atmosphere, so as to produce an insulating cover 12 having a nonuniform diameter and an uneven cell structure, and any tendency for the molten plastic to flow to the underside of the wire 11 as it passes through the atmosphere, so as to produce an insulating cover which is eccentric with respect to the wire, are substantially reduced.

As is well known in the art, the total expansion of the plastic which is taking place under a particular set of operating conditions readily can be determined in various manners from production samples of the completed insulated conductor 11. Further, whether over 90% of the total expansion of the plastic which is to take place is occurring in the extruder head 32, as desired, can be determined approximately by comparing the volume of the insulating cover 12 on a production sample with the volume which the insulating cover would have if it were the same diameter as the internal extrusion diameter of the extruding die 17. This volume differential will be approximately the expansion of the plastic which is occurring between the die 17 and the cooling trough 16, and the balance of the expansion of the plastic, except for a small portion taking place in the die, will be approximately that which is occurring in the head 32 before the plastic enters the die.

Referring in more specific detail to the typical extrusion process illustrated in FIG. 7, it is seen that the process involves the extrusion of black polypropylene onto the conductor wire 11 with the wire moving at 2750 feet per minute, and with hydrodicarbonamide ("Kempore R125") being used as the blowing agent. In the illustrated process, the total volume increase (VI) of the polypropylene is approximately 30% of its original volume, which produces a cellular insulation particularly suitable for communication purposes in which the diameter of the cells is about 2 mils. Of this 30% expansion by volume, approximately 28% expansion by volume is achieved in the extruder head 32 using a pressure in the extruder barrel 27 of about 5000 p.s.i.g. and a pressure drop through the breaker plate 31 between the barrel and the head of 2400 p.s.i.g. The remainder of the expansion of the plastic occurs in the extruding die 17 as it is being extruded onto the wire 11, and as the wire travels from the die through the atmosphere and into the movable section 24 of the water trough 16, with the movable section being positioned approximately two inches from the die and with the temperature of the cooling water at between 70–80° F.

Further with regard to the extrusion process illustrated in FIG. 7, it is seen that with a decomposition temperature of the blowing agent hydrodicarbonamide ("Kempore R125") of 385° F., the temperature of the plastic mass in the extruder barrel 27 increases progressively from a temperature $T_1$ of 340° F. at the one-third point of the barrel controlled by the pair of heaters 44 and 46, the thermocouple 58 and the temperature controller 59, to a temperature $T_2$ of 365° F. in the intermediate zone of the barrel controlled by the heater 47, the thermocouple 61 and the temperature controller 62. This increase in the temperature of the plastic continues through the decomposition temperature (385° F.) of the blowing agent to a temperature $T_3$ of 405° F. adjacent the exit end of the stock screw 29 in the barrel discharge zone controlled by the heater 48, the thermocouple 63 and the temperature controller 64, and finally reaches an extrusion temperature $T_4$ of 440° F. by the time the plastic is extruded onto the conductor 11 by the extruding die 17.

For other plastics and line speeds, while the plastic temperature values will vary from those shown in FIG. 7, they will remain in substantially the same relationship to one another. For example, in extruding white (or light colored) polypropylene, rather than black polypropylene as in the illustrated process, the temperatures are reduced approximately 40° F.

In operation, the premixed plastic particles and the blowing agent are introduced through the feed pipe 28 into the interior of the heated extruder barrel 27 at its entrance or left-hand end, as viewed in FIGS. 2 and 3A. The plastic particles then are engaged by the stock screw 29 and advanced through the barrel 27 to the right, as viewed in these figures, toward the apertured breaker plate 31 (FIG. 3B) at the discharge end of the barrel.

As the plastic particles are advanced through the barrel 27, they are worked intensely with a shearing action and are consolidated into a compact plastic mass by the screw 29, with the temperature of the plastic progressively increasing as a result of the working of the plastic and the progressively increasing temperature of the barrel. During this period, the blowing agent is unable to expand the plastic in the barrel 27 because of the high back pressure being created in the barrel by the apertured breaker plate 31.

However, as the plastic flows through the apertured breaker plate 31 into the conical passage 39 (FIGS. 3B and 6) in the extruder head 32, since the pressure in the head is substantially lower than the pressure in the barrel 27, the blowing agent expands the plastic to form a cellular structure therein. In this regard, the pressure drop through the breaker plate 31 between the discharge end of the barrel 27 and the entrance to the extruding die 17 in the head 32 is such that a major portion of the total expansion of the plastic which is to take place, preferably over 90%, occurs in the head.

The now expanding plastic then is extruded by the extruding die 17 onto the conductor wire 11 as it is being advanced by the capstan 13 through the die. The wire 11 with the expanding plastic extruder thereon then travels through the atmosphere a relatively short distance (about two inches) to the cooling trough 16, during which time the blowing agent continues to expand the plastic on the wire. Then, when the wire 11 enters the movable section 24 of the cooling trough 16, the plastic is quenched by the cooling water so that its temperature is substantially reduced and its expansion is substantially arrested, before it has reached its maximum possible expansion.

After leaving the cooling trough 16, the insulated wire 11 travels through the capacitance monitors 18 and 19, which are controlling the speed of the wire and the position of the entrance end of the movable cooling trough section 24 with respect to the extruding die 17 so as to obtain an insulated wire having a uniform capacitance along its length. The wire then travels through the above-mentioned diameter and eccentricity sensing devices, not shown, and finally is wound on reels by the above-mentioned take-up apparatus, also not shown.

While one embodiment of the invention has been disclosed many modifications will be apparent and it is intended that the invention be interpreted as including all modifications which fall within the true spirit and scope thereof.

What is claimed is:
1. The method of producing an article having at least a portion thereof of cellular construction, which comprises:
   working material and a heat decomposable blowing agent for expanding the material in an extrusion apparatus by an extrusion screw under heat and pressure to liquefy the material and to decomposse the blowing agent while advancing the material by the screw to a pressure type extrusion die for extruding the material;
   maintaining the temperature of the material at the discharge end of the screw and the entrance to the die substantially constant, with the temperature of at least a portion of the material between the discharge end of the screw and the entrance to the die at least equal to the decomposition temperature of the blowing agent; maintaining a pressure drop between the discharge end of the screw and the entrance to the die substantially constant at a value such that the major portion of the total expansion of the material which takes place occurs between the discharge end of the screw and the entrance to the die.

2. The method of producing an article having at least a portion thereof of cellular construction, which comprises:
   working material and a heat decomposable blowing agent for expanding the material in an extrusion apparatus by an extrusion screw under heat and pressure to liquefy the material and to decompose the blowing agent while advancing the material by the screw to a pressure type extrusion die for extruding the material;
   maintaining the temperature of the material at the discharge end of the screw and the entrance to the die substantially constant, with the temperature of at least a portion of the material between the discharge end of the screw and the entrance to the die at least equal to the decomposition temperature of the blowing agent; maintaining a pressure drop between the discharge end of the screw and the entrance to the die substantially constant at a value such that the major portion of the total expansion of the material which takes place occurs between the discharge end of the screw and the entrance to the die, without the material attaining its maximum possible expansion; and
   arresting the expansion of the material after it is extruded by the die such that the material still does not attain its maximum possible expansion and such that only a relatively small portion of the total expansion of the material which takes place occurs after it is extruded by the die.

3. The method of producing an article having at least a portion thereof of cellular construction, which comprises:

working material and a heat decomposable blowing agent for expanding the material in an extrusion apparatus by an extrusion screw under heat and pressure to liquefy the material and to decompose the blowing agent while advancing the material by the screw to a pressure type extrusion die for extruding the material;

maintaining the temperature of the material at the discharge end of the screw and the entrance to the die substantially constant, with the temperature of at least a portion of the material between the discharge end of the screw and the entrance to the die at least equal to the decomposition temperature of the blowing agent; maintaining a pressure drop between the discharge end of the screw and the entrance to the die substantially constant at a value such that the major portion of the total expansion of the material which takes place occurs between the discharge end of the screw and the entrance to the die, without the material attaining its maximum possible expansion; and cooling the material rapidly by quenching it in water after it is extruded by the die, to arrest the expansion of the material such that the material still does not attain its maximum possible expansion and such that only a relatively small portion of the total expansion of the material which takes place occurs after it is extruded by the die.

4. The method of producing an electrical conductor having cellular plastic insulation, which comprises:

advancing the conductor longitudinally through a pressure type extrusion die for extruding plastic around the conductor;

working the plastic and a heat decomposable blowing agent for expanding the plastic in an extruder barrel by an extruder screw under heat and pressure to liquefy the plastic and to decompose the blowing agent while advancing the plastic by the screw to the die;

maintaining the temperature of the plastic in the barrel and the pressure in the barrel constant at values such that substantially no expansion of the plastic occurs in the barrel;

maintaining the temperature of the plastic at the discharge end of the barrel and the entrance to the die substantially constant, with the temperature of at least a portion of the material between the discharge end of the barrel and the entrance to the die at least equal to the decomposition temperature of the blowing agent; maintaining a pressure drop between the discharge end of the barrel and the entrance to the die substantially constant at a value such that over 90% of the total expansion of the plastic which takes place occurs between the discharge end of the barrel and the entrance to the die, without the material attaining its maximum possible expansion; and cooling the plastic on the conductor rapidly by quenching it in water after the conductor leaves the die, to arrest the expansion of the plastic such that the plastic still does not attain its maximum possible expansion and such that not over 10% of the total expansion of the plastic which takes place occurs after the conductor leaves the die.

5. The method of producing an electrical conductor having cellular plastic insulation, as recited in claim 4, in which the temperature of the material between the discharge end of the barrel and the entrance to the die is maintained above the decomposition temperature of the blowing agent.

6. The method of producing an electrical conductor having cellular plastic insulation, as recited in claim 4, in which the plastic is polypropylene and the blowing agent is hydrodicarbonamide.

7. The method of producing an electrical conductor having cellular plastic insulation, as recited in claim 6, in which the total expansion of the plastic is approximately 30% by volume, with the expansion of the plastic between the discharge end of the barrel and the entrance to the die being approximately 28% by volume.

References Cited by the Examiner
UNITED STATES PATENTS

| | | | |
|---|---|---|---|
| 2,766,481 | 10/1956 | Henning | 264—47 |
| 2,820,987 | 1/1958 | Bunch | 264—40 |
| 2,885,737 | 5/1959 | Whalen et al. | 264—47 |
| 2,987,774 | 6/1961 | Jacobson | 264—53 |
| 3,026,273 | 3/1962 | Engles | 264—53 X |
| 3,029,476 | 4/1962 | Merck et al. | 264—47 |
| 3,030,623 | 4/1962 | Lehti et al. | 264—47 |
| 3,091,019 | 5/1963 | Wetteran | 264—47 X |
| 3,121,130 | 2/1964 | Wiley et al. | 264—53 |
| 3,219,733 | 11/1965 | Harris et al. | 264—54 X |

FOREIGN PATENTS

| | | |
|---|---|---|
| 682,464 | 3/1964 | Canada. |
| 629,668 | 9/1949 | Great Britain. |

ALEXANDER H. BRODMERKEL, *Primary Examiner.*

P. E. ANDERSON, *Assistant Examiner.*